United States Patent
Panzarella et al.

(10) Patent No.: US 7,458,760 B1
(45) Date of Patent: Dec. 2, 2008

(54) BASE FOR A LIFTING DEVICE FOR A PERSONAL TRANSPORTATION VEHICLE

(75) Inventors: Thomas A. Panzarella, Harleysville, PA (US); James B. Eldon, III, Barto, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 306 days.

(21) Appl. No.: 11/152,657

(22) Filed: Jun. 14, 2005

Related U.S. Application Data

(60) Provisional application No. 60/579,822, filed on Jun. 14, 2004.

(51) Int. Cl.
*B60P 1/54* (2006.01)
(52) U.S. Cl. .................. 414/543; 414/462; 212/180; 254/323
(58) Field of Classification Search .................. 414/542, 414/462, 543; 254/323; 248/282.1, 647; 212/180
See application file for complete search history.

(56) References Cited

U.S. PATENT DOCUMENTS

| | | | | |
|---|---|---|---|---|
| 1,429,216 A | * | 9/1922 | Arwine .................. 254/323 |
| 3,671,015 A | * | 6/1972 | Sullivan .................. 254/332 |
| 4,069,922 A | * | 1/1978 | Hawkins .................. 212/181 |
| 4,127,200 A | * | 11/1978 | Mann .................. 414/543 |
| 4,705,179 A | * | 11/1987 | Lathrum .................. 212/294 |
| 4,991,810 A | | 2/1991 | Andrus et al. .................. 248/286 |
| 5,337,855 A | * | 8/1994 | File .................. 182/150 |
| 5,431,526 A | * | 7/1995 | Peterson et al. .................. 414/543 |
| 5,810,547 A | * | 9/1998 | Bruno et al. .................. 414/543 |
| 5,853,282 A | * | 12/1998 | Bechler et al. .................. 414/543 |
| 6,135,300 A | * | 10/2000 | Fox .................. 212/179 |
| 6,547,507 B1 | | 4/2003 | Gest et al. .................. 414/543 |
| 6,821,075 B2 | * | 11/2004 | van der Horn .................. 414/462 |
| 7,377,740 B2 | * | 5/2008 | Panzarella et al. .................. 414/543 |
| 2005/0220597 A1 | * | 10/2005 | Burkett .................. 414/542 |

OTHER PUBLICATIONS

U.S. Appl. No. 10/830,252, filed Apr. 22, 2004, Panzarella.

* cited by examiner

*Primary Examiner*—James Keenan
(74) *Attorney, Agent, or Firm*—Synnestvedt & Lechner LLP

(57) ABSTRACT

A preferred embodiment of a lifting device for a personal-transportation vehicle includes an arm for lifting the personal transportation vehicle, a column for supporting the arm, and a base for supporting and stabilizing the column. The base includes a bar pivotally coupled to the column and capable of being secured to a mounting surface.

12 Claims, 3 Drawing Sheets

BASE FOR A LIFTING DEVICE FOR A PERSONAL TRANSPORTATION VEHICLE

CROSS REFERENCE TO RELATED APPLICATIONS

This application claims priority under 35 U.S.C. § 119(e) to U.S. provisional application No. 60/579,822, filed Jun. 14, 2004, the contents of which is incorporated by reference herein in its entirety.

FIELD OF THE INVENTION

The present invention relates to a device for lifting a personal transportation vehicle, such as a motorized wheel chair, scooter, or power chair, onto and off of a larger vehicle such as a pickup truck, van, automobile, or sport utility vehicle.

BACKGROUND OF THE INVENTION

Personal transportation vehicles, such as motorized wheel chairs, scooters, power chairs, etc., are commonly used by persons having ambulatory difficulties or other disabilities. Personal transportation vehicles are often transported in a pickup truck, van, automobile, sport utility vehicle, or other suitable vehicle (hereinafter referred to as a "transporting vehicle"). Although compact, personal transportation vehicles can weigh several hundred pounds. Thus, some type of lifting device is usually required to load the personal transportation vehicle onto and off of the transporting vehicle.

A typical lifting device can include a horizontally-oriented arm having a retractable strap extending therefrom for lifting the personal transportation vehicle. Some types of arms may telescope to increase the overall length of the arm, thereby permitting the end of the arm to be located directly over the center of gravity of the personal transportation vehicle during lifting.

The lifting arm is usually supported by a column that extends, at least in part, in the vertical direction. The column can be rotatably coupled to a base secured to the floor, bed, or other suitable mounting surface of the transporting vehicle. Rotation of the column in relation to the base permits the arm (and the personal transportation vehicle) to be swung into and out of the interior or bed of the transporting vehicle, once the personal transportation vehicle has been lifted to an appropriate height.

The base of a conventional arm-type lifting device, in general, must be configured by the manufacturer or installer for a left or right hand installation, i.e., for installation on a particular side of the transporting vehicle. Hence, additional parts must often be designed, manufactured, and provided with the lifting device to facilitate the possibility of both left and right-hand installations. Moreover, reconfiguring the base between a left and right hand mounting configuration after delivery to the user may require that the lifting device be returned to the dealer or other location where trained service personnel and appropriate tooling are located.

Moreover, the base of a conventional arm-type lifting device is usually bulky, and may by subject to interference with the wheel well or other structure of the transporting vehicle. More particularly, a typical base includes two elongated, tubular legs. The legs are secured to the mounting surface, and help to stabilize the lifting device. The relatively large diameter of the tubular legs, in general, makes it difficult for the wheels of the personal transportation vehicle to traverse the legs once the personal transportation vehicle has been placed in the transporting vehicle. Hence, it may be difficult or unfeasible to move the personal transportation vehicle after loading.

Moreover, the legs are usually fixed to the remainder of the base in a rigid manner, so that the orientation of the legs cannot be changed. The potential for interference between the legs, and obstructions on the mounting surface such as wheel wells, can limit the placement of the lifting device within the transporting vehicle. In other words, the need to place the lifting device in a position where the legs will not interfere with obstacles in the transporting vehicle may necessitate placing the lifting device in an undesired, or less than optimal location.

SUMMARY OF THE INVENTION

A preferred embodiment of a base for a lifting device for a personal-transportation vehicle comprises a base plate for mounting the lifting device on a mounting surface and supporting a mounting column of the lifting device, and a substantially v-shaped tube secured to the base plate. The base also comprises a first and a second substantially flat leg. The first and second substantially flat legs are pivotally coupled to the substantially v-shaped tube so that an orientation of the respective first and second substantially flat legs in relation to the base can be adjusted to avoid obstructions on the mounting surface.

A preferred embodiment of a lifting device for a personal-transportation vehicle comprises an arm for lifting the personal transportation vehicle, a column for supporting the arm, and a base for supporting and stabilizing the column. The base comprises a bar pivotally coupled to the column and capable of being secured to a mounting surface.

A preferred method is provided for mounting a lift for a personal-transportation vehicle on a surface. The lift comprises a base having a base plate and a substantially flat bar pivotally coupled to the base plate. The method comprises placing the base plate on the surface, and at least one of pivoting a substantially flat leg of the base in relation to the base plate so that the substantially flat leg clears an obstruction on the surface, shortening the substantially flat leg by cutting the substantially flat leg so that the substantially flat leg clears the obstacle, and placing the substantially flat leg on an underside of the surface and securing the substantially flat leg to the underside of the surface.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DETAILED DESCRIPTION OF ILLUSTRATIVE EMBODIMENTS

The figures depict a preferred embodiment of a base 10 for a lifting device for a personal-transportation vehicle. The base 10 can be integrated into a lifting device 100. The base 10 can be used to mount the lifting device 100 a mounting surface 19 of a vehicle such as a pickup truck, van, automobile, sport utility vehicle, etc. (hereinafter referred to as a "transporting vehicle").

The lifting device 100 can be used to lift a personal transportation vehicle, such as a motorized wheel chair, scooter, power chair, etc., onto and off the transporting vehicle.

Figure 2:
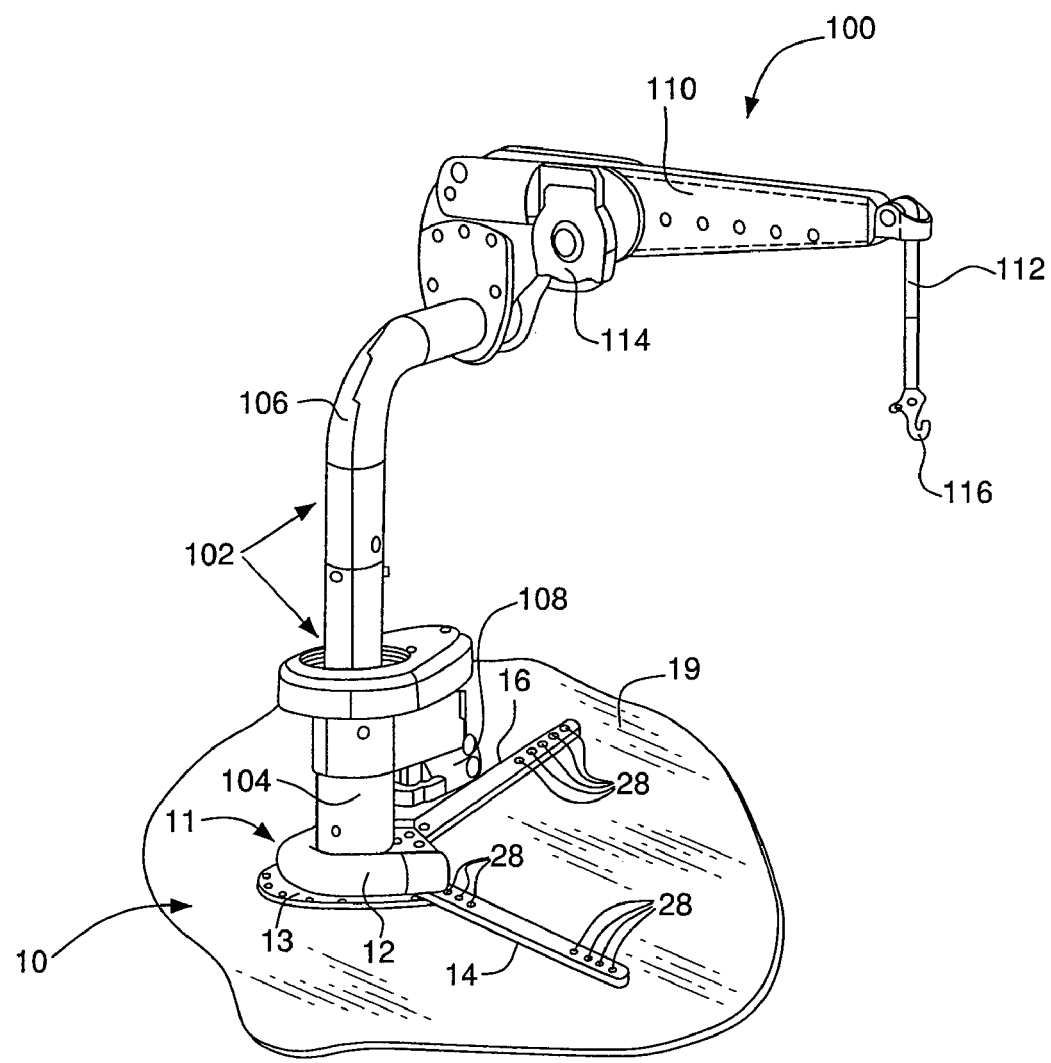
FIG. 2 is a perspective view of a lifting device for a personal-transportation vehicle, the lifting device incorporating the base shown in FIG. 1.

The lifting device 100 can include the base 10, and a mounting column 102. The mounting column 102 can include a collar 104, a tube 106 having a bend of approximately ninety degrees formed therein, and a motor 108 (see FIG. 2). The tube 106 is mounted on the collar 104, and can be rotated in relation to the collar 104 by the motor 108.

The lifting device 100 can also include an arm 110 rotatably coupled to the tube 106, and a strap 112 and motor 114 mounted on the arm 110. The motor 114 turns a spool (not shown) mounted within the arm 110. The strap 112 is wound onto the spool, so that rotation of the spool causes the strap 112 to retract into, or extend from the arm 110.

The strap 112 has a hook 116 attached to an end thereof. The hook 116 can engage a lifting feature on the personal transportation vehicle, so that the personal transportation vehicle can be lifted and lowered as the strap 112 is retraced and extended.

Further details of lifting devices such as the lifting device 100 are included in U.S. application Ser. No. 10/830,252, filed Apr. 22, 2004, the contents of which is incorporated by reference herein in its entirety.

Specific details of the lifting device 100 are provided herein for exemplary purposes only. The base 10 can be incorporated into other types of lifting devices including, for example, lifting devices in which the strap and the mounting column translate on a manual basis.

Figure 1:
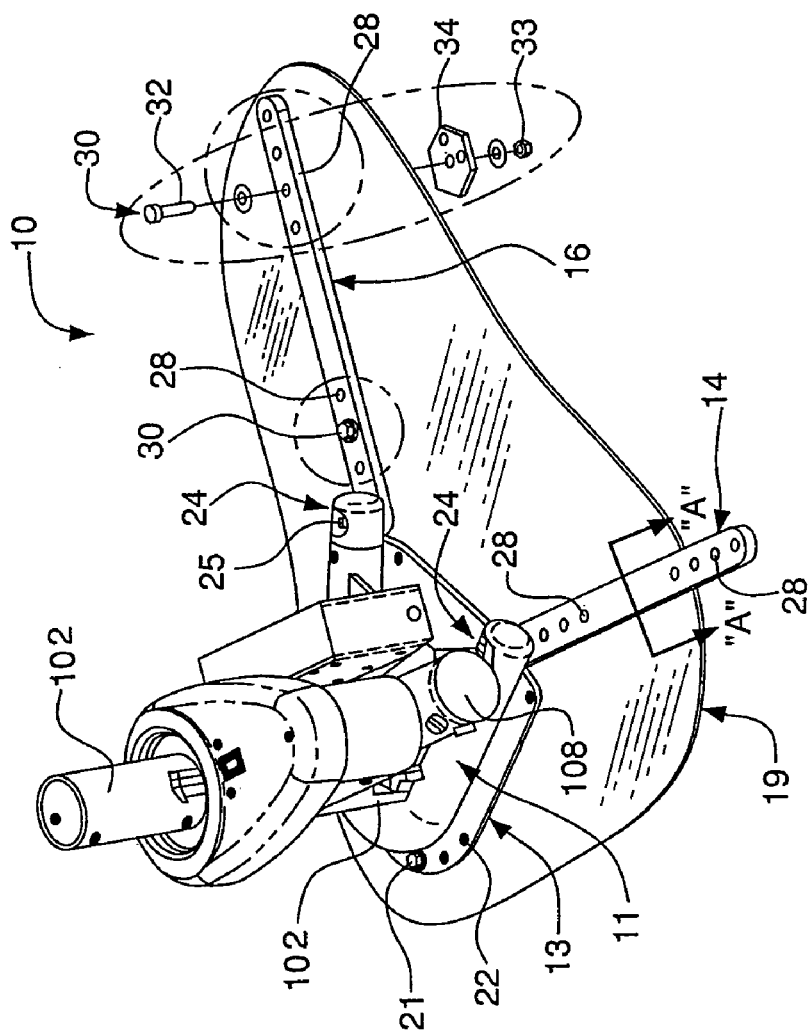
FIG. 1 is a perspective view of a preferred embodiment of a base for a lifting device for a personal-transportation vehicle.

The base 10 preferably comprises an intermediate member 11, a base plate 13, a first leg 14, and a second leg 16 (see FIG. 1). The intermediate member 11 preferably comprises a substantially v-shaped tube 12. The use of a substantially v-shaped tube is disclosed for exemplary purposes only; the tube 12 can have other shapes, such a C-shape, in alternative embodiments.

The tube 12 is secured to the base plate 13 by a suitable means such as welding. The collar 104 of the mounting column 102 can be secured to one or both of the tube 12 and the base plate 13, by a suitable means such as fasteners or welding.

The base plate 13 can be secured to the mounting surface 19 of the transporting vehicle using, for example, fasteners 21 that extend through holes 22 formed in the base plate 13. The number of holes 22 is preferably chosen to provide the installer with flexibility in choosing an appropriate location on the mounting surface 19 for each fastener 21.

Figure 3:
FIG. 3 is a transverse cross-sectional view of a leg of the base shown in FIGS. 1 and 2, taken through the line "A-A" of FIG. 1.

The first and second legs 14, 16 help to stabilize the mounting column 104. Preferably, the first and second legs 14, 16 are each formed as an elongated, substantially flat bar having a substantially rectangular cross section, so that the first and second legs 14, 16 each have a substantially flat upper surface and a substantially flat lower surface (see FIG. 3).

A first end of the first leg 14 is pivotally coupled to a first end of the intermediate member 11. A first end of the second leg 16 is pivotally coupled to a second end of the intermediate member 11.

The intermediate member 11 preferably comprises two knuckle hinge joints 24 each secured to opposite ends of the tube 12. In other words, the ends of the intermediate member 11 preferably are formed by the knuckle hinge joints 24. The first and second legs 14, 16 are each pivotally coupled to an associated knuckle hinge joint 24 by a fastener 25. This configuration permits the first and second legs 14, 16 to pivot in relation to the tube 12 and the base plate 13.

The first leg 14 has a plurality of holes 28 formed therein. Preferably, four of the holes 28 are located proximate the first end of the first leg 14, and another four of the holes 28 are located proximate a second end of the first leg 14. Preferably, the hole 28 located closest to the first end accommodates the bolt 25. The other holes 28 can accommodate one or more fasteners 30 that secure the first leg 14 to the mounting surface 19 (the fasteners are not depicted in FIG. 2, for clarity). Each fastener 30 can include, for example, a bolt 32, nut 33, and a plate member 34 that helps to distribute the reactive force on the underside of the mounting surface 19. (Fasteners that are tapped directly into the mounting surface 19 can be used in the alternative.)

The second leg 16 has a plurality of holes 28 formed therein, in a configuration substantially identical to that of the first leg 14. The second leg 16 can be secured to the mounting surface 19 in a manner substantially identical to the first leg 14 (The fasteners 30 associated with the second leg 16 are not shown in FIG. 1, for clarity.)

The use of multiple holes 28, in combination with the ability of the first and second legs 14, 16 to pivot in relation to the tube 12, can permit the fasteners 30 to be located at an optimal location on the mounting surface 19. Moreover, the portion of each of the first or second leg 14, 16 beyond the outermost fastener 30 can be cut off, to reduce the footprint of the first or second leg 14, 16 on the mounting surface 19, or to avoid an obstruction on the mounting surface.

The use of two distinct, spaced-apart sets of holes 28 can provide a ready visual guide to the installer when the installer is instructed to install at least one fastener 30 in each of the sets of holes 28.

The substantially flat shape of the first and second legs 14, 16 gives the first and second legs 14, 16 a relatively compact profile. More particularly, the height of the first and second legs 14, 16 is small in relation to conventional tubular legs. This feature can permit the first and second legs 14, 16 to be positioned in locations where the available vertical clearance is limited. For example, it may be possible under certain circumstances to position the first and second legs 14, 16 beneath obstructions that larger, tubular legs would be unable to clear.

Moreover, the substantially flat profile of the first and second legs 14, 16 can help minimize the potential for interference between the base 10 and the personal transportation vehicle. More particularly, it is believed that the wheels of the personal transportation vehicle can pass over the first and second legs 14, 16 with relative ease. Hence, the first and second legs 14, 16 do not act as an obstruction as the personal transportation vehicle is positioned on the mounting surface 19, in contradistinction to conventional tubular legs.

Figure 4:
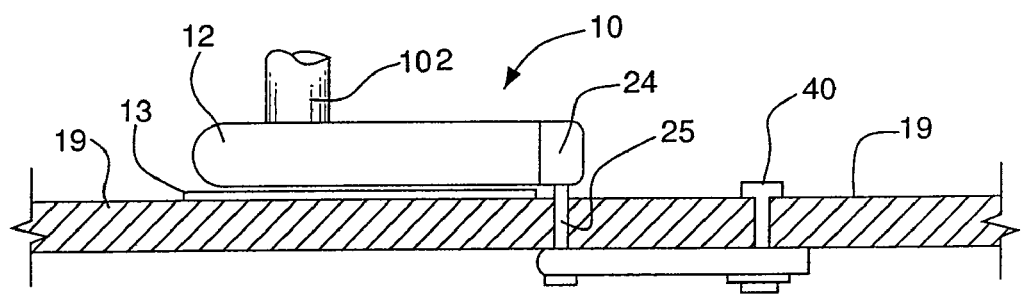
FIG. 4 is a side view of an alternative installation of the base shown in FIGS. 1-3.

FIG. 4 depicts an alternative installation for the base 10. In particular, FIG. 4 depicts the first and second legs 14, 16 positioned on the underside of the mounting surface 19, and pivotally coupled to the tube 12 by way of fasteners 40 that extend through the mounting surface 19. This configuration can eliminate the need to position the first and second legs 14, 16 on the mounting surface 19.

The ability of the first and second legs 14, 16 to pivot in relation to the tube 12 can permit the orientation of the first and second legs 14, 16 to be varied in relation to the base plate 13. This feature can permit the positions of the first and second legs 14, 16 to be adjusted to avoid obstructions, e.g., wheel wells, on the mounting surface 19. Thus, the base plate 13 can be positioned at a desired location on the mounting surface 19, and the respective orientations of the first and second legs 14, 16 can be adjusted to accommodate the location of the base plate 13. For example, the base plate 13 can be positioned in an area to the rear of the wheel well on the bed of a pickup truck, leaving the remainder of the bed available as usable cargo area. The first and second legs 14, 16 can be adjusted to provide adequate stabilization for the base plate 13, while avoiding potential obstructions such as wheel wells, the sides of the bed, the tailgate, etc.

Moreover, the ability to tailor the positions of the first and second legs 14, 16 to a particular installation can help maximize the use of mounting hardware that distributes the reactive forces on the mounting surface.

The pivotal movement of the first and second legs 14, 16 in relation to the base plate 13 can also permit the base 10 to be configured so as to minimize its shipping profile, thereby permitting the base 10 to fit within a smaller shipping crate or box than would otherwise be possible.

The above-noted configuration of the base 10 can also permit the base 10 to be installed in left-hand and right-hand installations without a need for reconfiguration. Moreover, the base 10 can be used in different types of vehicles, such as sport utility vehicles, vans, pickup trucks, automobiles, etc., without a need for additional equipment or conversion packages for a particular type of vehicle. Also, the base 10 represents a single unit that does not require the use of subassemblies.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims. For example, the first and second legs 14, 16 can be pivotally coupled directly to a base plate, such as the base plate 13, in alternative embodiments. In other words, alternative embodiments can be constructed without the intermediate member 11.

What is claimed:

1. A lifting device for a personal-transportation vehicle, comprising:
    an arm for lifting the personal transportation vehicle;
    a column for supporting the arm; and
    a base for supporting and stabilizing the column and comprising: a first and a second bar each pivotally coupled to the column and capable of being secured to a mounting surface; a plate having the column fixedly coupled thereto; and an intermediate member secured to the plate and comprising a substantially v-shaped portion, wherein: the first bar pivots in relation to the column about a first axis substantially parallel to a longitudinal axis of the column; the second bar pivots in relation to the column about a second axis spaced apart from the first axis and substantially parallel to the longitudinal axis of the column; and the first and second bars are pivotally coupled to the plate by way of the intermediate member and are pivotally coupled to the column by way of the plate.

2. The lifting device of claim 1, wherein the first and second bars each have a substantially flat upper surface and a substantially flat lower surface.

3. The lifting device of claim 1, wherein the intermediate member comprises a tube.

4. The lifting device of claim 1, wherein the intermediate member comprises a first and a second knuckle hinge joint for pivotally coupling the respective first and second bars to the intermediate member.

5. The lifting device of claim 4, further comprising a first fastener positioned within the first knuckle hinge joint for pivotally coupling the first bar to the intermediate member; and a second fastener positioned within the second knuckle hinge joint for pivotally coupling the second bar to the intermediate member.

6. The lifting device of claim 1, wherein the first and second bars each have a first and a second plurality of holes formed therein, the first plurality of holes of the first or second bar being formed proximate a first end of the first or second bar, the second plurality of holes of the first or second bar being formed proximate a second end of the first or second bar.

7. The lifting device of claim 1, wherein the first and second bars each have a substantially rectangular transverse cross section.

8. The lifting device of claim 1, wherein the first and second bars are pivotally coupled to opposing ends of the intermediate member.

9. The lifting device of claim 1, further comprising a bolt and a second plate configured to securely mate with the bolt, wherein the first bar has a hole formed therein for receiving the bolt so that the bolt can extend through the first bar and the mounting surface, and the second plate can contact an underside of the mounting surface when the second plate is mated with the bolt so that the second plate urges the bolt against the first bar.

10. The lifting device of claim 1, further comprising a strap for suspending the personal-transportation vehicle from the arm.

11. The lifting device of claim 1, wherein an angular position of the first bar in relation to the longitudinal axis of the column can be adjusted independent of an angular position of the second bar in relation to the longitudinal axis of the column.

12. A lifting device for a personal-transportation vehicle, comprising:
    an arm for lifting the personal transportation vehicle;
    a column for supporting the arm; and
    a base for supporting and stabilizing the column and comprising: a first and a second bar each pivotally coupled to the column and capable of being secured to a mounting surface; a plate having the column fixedly coupled thereto; and an intermediate member secured to the plate and comprising a tube, wherein: the first bar pivots in relation to the column about a first axis substantially parallel to a longitudinal axis of the column; the second bar pivots in relation to the column about a second axis spaced apart from the first axis and substantially parallel to the longitudinal axis of the column; and the first and second bars are pivotally coupled to the plate by way of the intermediate member and are pivotally coupled to the column by way of the plate.

* * * * *